(12) United States Patent
Cox et al.

(10) Patent No.: US 7,216,232 B1
(45) Date of Patent: May 8, 2007

(54) METHOD AND DEVICE FOR INSERTING AND AUTHENTICATING A DIGITAL SIGNATURE IN DIGITAL DATA

(75) Inventors: Ingemar J. Cox, Lawrenceville, NJ (US); Matthew L. Miller, Princeton, NJ (US); Douglas F. Rayner, San Francisco, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,956

(22) Filed: Apr. 20, 1999

(51) Int. Cl.
*H04L 9/00* (2006.01)
(52) U.S. Cl. .................................... 713/176; 713/181
(58) Field of Classification Search ............... 713/168, 713/167, 176, 201; 380/202, 257, 167, 267
See application file for complete search history.

(56) References Cited

U.S. PATENT DOCUMENTS

| | | | | |
|---|---|---|---|---|
| 5,175,765 A | * | 12/1992 | Perlman ...................... | 380/30 |
| RE34,954 E | * | 5/1995 | Haber et al. ................. | 713/177 |
| 5,455,865 A | * | 10/1995 | Perlman ...................... | 713/153 |
| 5,499,294 A | * | 3/1996 | Friedman ..................... | 380/10 |
| 5,557,518 A | * | 9/1996 | Rosen .......................... | 705/69 |
| 5,579,393 A | * | 11/1996 | Conner et al. ............... | 713/176 |
| 5,613,012 A | * | 3/1997 | Hoffman et al. ............. | 382/115 |
| 5,621,797 A | * | 4/1997 | Rosen .......................... | 705/76 |
| 5,640,002 A | * | 6/1997 | Ruppert et al. ......... | 235/462.46 |
| 5,646,997 A |   | 7/1997 | Barton | |
| 5,648,648 A | * | 7/1997 | Chou et al. .................. | 235/382 |
| 5,712,679 A | * | 1/1998 | Coles .......................... | 348/158 |
| 5,715,487 A | * | 2/1998 | McIntyre et al. ........... | 396/299 |
| 5,734,752 A | * | 3/1998 | Knox .......................... | 382/212 |

(Continued)

OTHER PUBLICATIONS

Schneier, Bruce. Applied Cryptography. 1995. pp. 38, 59, 75-76.*

(Continued)

*Primary Examiner*—Kambiz Zand
(74) *Attorney, Agent, or Firm*—Scully, Scott, Murphy & Presser, P.C.

(57) ABSTRACT

A method for inserting a digital signature into digital data is provided. The digital data has bits and the method includes the steps of: assigning predetermined bits of the digital data for receiving the digital signature; signing the digital data excluding the predetermined bits resulting in the digital signature; and inserting the digital signature into the predetermined bits of the digital data for subsequent authentication of the digital data. Also provided is a method for authenticating digital data having the embedded digital signature in the predetermined bits of the digital data including the steps of: extracting the digital signature from the predetermined bits; decrypting the digital signature from the digital data resulting in a first hash; applying a known one-way hashing function used by an encoder of the digital data to the digital data excluding the predetermined bits resulting in a second hash; and comparing the first hash to the second hash wherein if the first hash matches the second hash the digital data is authentic. In a preferred version of the methods of the present invention, the method further includes the step of inserting associated data into the digital data prior to the signing step such that the digital signature authenticates both the associated data as well as the digital data. Preferably, the associated data is inserted into the bits of the digital data excluding the predetermined bits.

71 Claims, 6 Drawing Sheets

U.S. PATENT DOCUMENTS

| | | | | |
|---|---|---|---|---|
| 5,742,771 | A * | 4/1998 | Fontaine | 709/225 |
| 5,771,101 | A * | 6/1998 | Bramall | 358/405 |
| 5,787,172 | A * | 7/1998 | Arnold | 380/21 |
| 5,841,886 | A | 11/1998 | Rhoads | |
| 5,850,444 | A * | 12/1998 | Rune | 380/21 |
| 5,862,217 | A | 1/1999 | Steinberg et al. | |
| 5,862,218 | A * | 1/1999 | Steinberg | 380/10 |
| 5,870,499 | A * | 2/1999 | Bender et al. | 382/232 |
| 5,875,249 | A | 2/1999 | Mintzer et al. | |
| 5,889,861 | A * | 3/1999 | Ohashi et al. | 380/21 |
| 5,898,779 | A * | 4/1999 | Squilla et al. | 713/176 |
| 6,005,936 | A * | 12/1999 | Shimiau et al. | 380/4 |
| 6,061,451 | A * | 5/2000 | Muratani et al. | 380/201 |
| 6,154,541 | A * | 11/2000 | Zhang | 380/28 |
| 6,182,218 | B1 * | 1/2001 | Saito | 713/176 |
| 6,256,736 | B1 * | 7/2001 | Coppersmith et al. | 713/176 |
| 6,263,438 | B1 * | 7/2001 | Walker et al. | 713/178 |
| 6,367,013 | B1 * | 4/2002 | Bisbee et al. | 713/178 |
| 6,389,538 | B1 * | 5/2002 | Gruse et al. | 713/194 |
| 6,396,937 | B2 * | 5/2002 | Chen et al. | 382/100 |
| 6,507,371 | B1 * | 1/2003 | Hashimoto et al. | 348/552 |
| 6,587,837 | B1 * | 7/2003 | Spagna et al. | 705/26 |

OTHER PUBLICATIONS

Daly, James, Computerworld, "Fingerprinting a Computer Security Code", Jul. 27, 1992, vol. 26, Iss 30, p. 25.*

Kundur, et al., Towards a Telltale Watermarking Technique for Tamper Proofing.

Lin, et al., An Image Authenticator Surviving DCT-Based Variable Quantization Table Compressions.

Lin, et al., A Watermark-Based Robust Image Authentication Method Using Wavelets, Advent Report, Columbia, University, Apr. 1998.

Lin, et al., Generating Robust Digital Signature For Image/Video Authentication, Multimedia and Security Workshop at a ACM Multimedia '98, Bristol, U.K., Sep. 1998.

Lin, et al., A Robust Image Authentication Method Surviving JPEG Lossy Compression, SPIE Storage and Retrieval of Image/Video Databases, San Jose, CA, Jan. 1998.

Matsui, et al., Video-Stenography: How To Secretly Embed a Signature in a Picture, IMA Intellectual Property Project Proceedings, vol. 1, Issue 1, pp. 187-206, Jan. 1994.

Schneider, et al., A Robust Content Based Digital Signature For Image Authentication, 3rd IEEE International Conference on Image Processing, vol. 3, pp. 227-230, 1996.

Schyndel, et al., A Digital Watermark, IEEE Conference Publication.

Wong, A Public Key Watermarking For Image Verification and Authentication.

Friedman, The Trustworthy Digital Camera, Restoring Credibility To The Photographic Image, IEEE Transactions on Consumer Electronics, vol. 39, No. 4, pp. 905-910, Nov. 1993.

Hsu, et al., Hidden Signatures In Images, Proceedings of the 1996 IEEE International Conference In Image Processing, ICIP '96, vol. 3, pp. 223-226, 1996.

* cited by examiner

METHOD AND DEVICE FOR INSERTING AND AUTHENTICATING A DIGITAL SIGNATURE IN DIGITAL DATA

BACKGROUND OF THE INVENTION

1. Field of the Invention

The present invention relates generally to methods and devices for inserting and authenticating a digital signature in digital data and, more particularly, encoders and decoders for inserting and authenticating a digital signature and associated data in digital image, video, and audio data.

2. Prior Art

Photographs, music and video are increasingly being digitally represented. There are a variety of reasons for this, including improved image or audio quality and more economic distribution capabilities. However, digital data content owners (hereinafter "content owners") are increasingly aware of the associated risks of piracy and considerable effort has been directed towards minimizing this risk. Digital watermarking is one tool that has received attention for minimizing these risks. An early focus was on the design of watermarks that were not perceptible yet survived many forms of common signal processing such as MPEG-2 or JPEG-compression.

It is known in the art that there is also a need for fragile watermarks, e.g. watermarks that do not survive simple image processing operations. The purpose of these fragile watermarks is to provide a viewer with an indication of whether an image has been tampered with. The integrity of digital images is increasingly of concern since many low cost software systems allow very sophisticated image editing capabilities that can seamlessly alter an image. Currently, photographs are considered excellent evidence to support descriptions of events. However, this may change, if widespread "doctoring" of images leads the general public to become suspicious of the authenticity of an image.

These issues have also been addressed in the art. The solution has been one based on classical cryptography within which authentication is well understood. The basic idea behind cryptographic authentication is to pass the data through a one-way hash function resulting in an N-bit hash. The N-bit hash is then encrypted using the private key of a public key encryption algorithm to form a digital signature. To authenticate the data, the data in question is once again hashed and this N-bit sequence is compared with the digital signature that is decrypted using the associated public key.

A disadvantage of the system as it was originally proposed for a image data was the need for two files, one containing the image and the other containing the signature. Authentication requires the presence of both files, which can be a nuisance since it is very easy, for example, to transmit an image but forget to transmit the associated signature. Ideally, a single file would suffice. An obvious solution would be to concatenate the signature into the header of the image file format. However, this solution is problematic when images are converted between various file formats, e.g. tiff, bmp, etc.

Recently, Wong [P. H. Wong, "A Public Key Watermark for Image Verification and Authentication", Int. Conf. On Image Processing, 455–459, October 1998] proposed a straightforward way to insert a function of the signature into the image itself. Such a system has the advantage of being unaffected by changes in image file formats and does not need any form of meta-data. Authentication is performed on independent blocks of the image. For each block, $X^r$, the least significant bit of each pixel is set to zero. This modified block is then passed through a hash function, together with the original image width and height information. The output of this hash function is then exclusive OR'ed (XOR'ed) with a corresponding set of bits, $B_r$, to form a signature, $W_r$, which is public key encrypted such that $C_r = E_K (W_r)$ and $C_r$ is inserted into the least significant bit (LSB) of the block to form a watermarked image block $Y_r$. Wong teaches that $B_r$ is a binary image or pattern whose dimensions must be less than or equal to the length of the hash. The purpose of the XOR is to scramble the binary image, $B_r$. Subsequently, at decoding, the LSB plane of each block is decrypted using the associated public key and it is XOR'ed with the hash of the block after setting the least significant bits of the block to zero. If the block is authentic, i.e. unchanged, then the result is once again $B_r$, i.e., XORing a second time with the same hash value unscrambles the pattern $B_r$. Otherwise, the pattern remains scrambled. Authentication of the image is performed by visual inspection of the patterns, $B'_r$, though in practice, a computer could perform a bit-wise comparison of $B_r$ and $B'_r$. Strictly, such a scheme only authenticates the most significant bits of each pixel since the LSB is altered so as to carry the corresponding encrypted signature.

Others in the art have described situations in which rightful ownership could not be resolved by a straightforward application of watermarking. In particular, they identified a situation in which anyone could claim ownership of a watermarked image through a process whereby a counterfeit watermark is inserted. They proposed a solution to this problem using a method called "non-invertible" watermarking. The basic idea behind this method is to construct a watermark based on a non-invertible function of the original image. An example of a non-invertible function is a one-way hash function commonly used in cryptography. Such a function takes a string of bits as input and outputs a finite, for example, a 1000-bit output. However, given the 1000-bit output, it is computationally infeasible to determine the corresponding input. It should be noted that such a watermark can only be read by the content owner or someone in possession of the original image or its hashed key. Thus, a public watermark, i.e. a watermark that can be read by anyone, cannot be non-invertible or, at least, the benefits of non-invertibility are lost since all readers must have knowledge of the hashed value.

Furthermore, authenticating an image that is to be subsequently compressed and later decompressed is troublesome with the methods and devices of the prior art. Many in the art have looked at this problem from the perspective of authentication schemes that survive JPEG compression. That is, while the digital data has been altered by the lossy compression, the image is essentially the same.

SUMMARY OF THE INVENTION

In the methods and devices of the present invention a signature is inserted into predetermined bits of digital data for authentication of the digital data. Alternatively, both the digital data and some associated information are both authenticated. This associated information might include copyright notices, owner identification, amongst other things. This information may be embedded into the image in a variety of ways, as have been discussed in the watermarking literature. This embedding is performed prior to signing (creating the digital signature by hashing and encrypting).

In a version of the methods and devices of the present invention, we are concerned with the situation in which a compression algorithm is well known to the authentication system. This approach is applicable to, for example a JPEG compressed image or MPEG compressed video. In particular, the present invention is applicable to the problem of authentication within a digital camera or other image generation devices, though the solution is not limited to such a situation. Digital cameras with resolutions of 1K×1K produce very large amounts of data which must be both stored and possibly transmitted from the camera to a computer. To expedite this process, it is expected that such data will be compressed in order to reduce the storage and bandwidth requirements. However, when the image is eventually decompressed, the viewer must still be able to authenticate the image.

In yet another version of the methods and devices of the present invention not only is digital data signed for authentication purposes but it is also time stamped in order to be able to prove the time of origin. A further refinement of this system is to time stamp the image with both time and place of the image generation device, the latter information preferably being available through a Global Positioning Satellite (GPS) receiver.

Accordingly, a method for inserting a digital signature into digital data is provided. The digital data comprises bits and the method comprising the steps of: assigning predetermined bits of the digital data for receiving the digital signature; signing the digital data excluding the predetermined bits resulting in the digital signature; and inserting the digital signature into the predetermined bits of the digital data for subsequent authentication of the digital data.

Also provided is a method for authenticating digital data having the embedded digital signature in the predetermined bits of the digital data. The method comprises the steps of: extracting the digital signature from the predetermined bits; decrypting the digital signature from the digital data resulting in a first hash; applying a one-way hashing function to the digital data excluding the predetermined bits resulting in a second hash; and comparing the first hash to the second hash wherein if the first hash matches the second hash the digital data is authentic.

In a preferred version of the methods of the present invention, the signing step comprises: applying a one-way hashing function to the digital data excluding said predetermined bits resulting in a hash; and encrypting the hash.

In yet another preferred version of the methods of the present invention the method further comprises the step of inserting associated data into the digital data prior to the signing step such that the digital signature authenticates both the associated data as well as the digital data. Preferably, the associated data is inserted into the bits of the digital data excluding the predetermined bits.

Also provided are encoders and decoders for carrying out the methods of the present invention.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Although this invention is applicable to numerous and various types of digital data, it has been found particularly useful in the environment of digital image data generated with a digital camera. Therefore, without limiting the applicability of the invention to image data or a digital camera, the invention will be described in such environment. However, those of ordinary skill in the art will recognize that the methods and devices of the present invention are equally applicable to digital video and digital audio data and any type of digital data generation device.

Figure 1A:
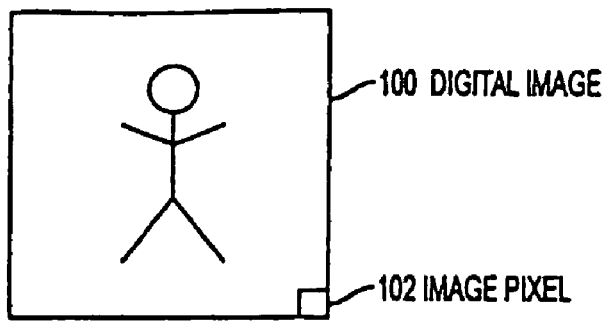
FIG. 1A illustrates a digital image or an image frame of a digital video sequence, wherein the image or image frame comprises digital data defining a plurality of pixels.
Figure 1B:
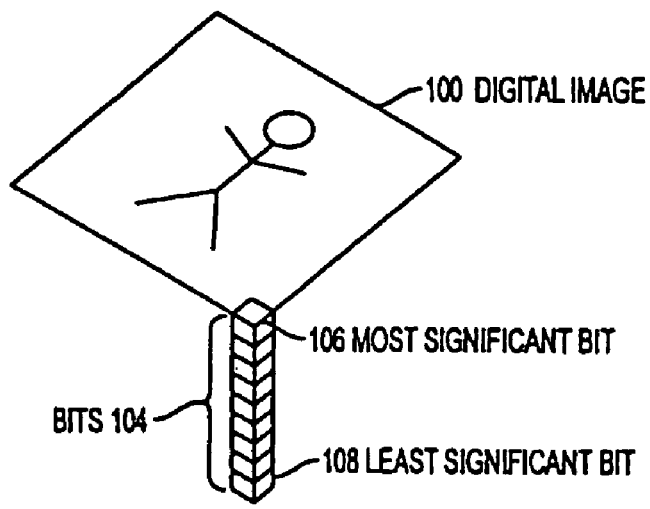
FIG. 1B illustrates the image or image frame of FIG. 1A showing the bits comprising each of the plurality of pixels, from a most significant bit to a least significant bit.
Figure 1C:
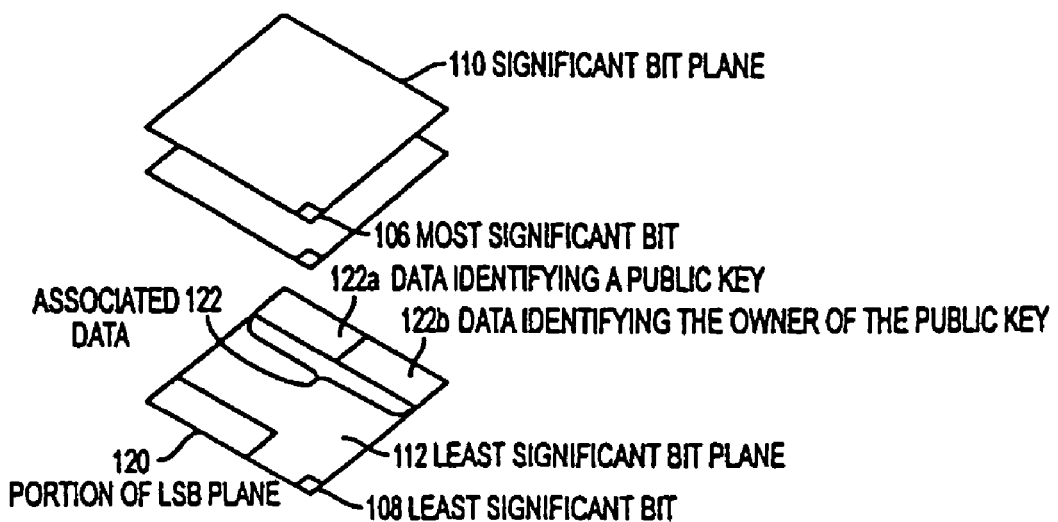
FIG. 1C illustrates the image or image frame of FIG. 1A represented as bit planes, from a-most significant bit plane to a least significant bit plane.

Before discussing the present invention, a brief overview of a digital image will be discussed with reference to FIGS. 1A–1D. FIG. 1A illustrates a digital image 100. The digital image 100 can also be an image frame from a sequence of image frames in digital video. The digital image is represented by a plurality of image pixels 102, one of which is illustrated in the lower right corner of the image 100. Referring now to FIG. 1B, each pixel is defined by a plurality of bits 104, from a most significant bit (MSB) 106 most visually perceptible to the human eye, to a least significant bit (LSB) 108 least visually perceptible to the human eye. As can be seen in FIG. 1C, each corresponding bit for the pixels comprising the image 100 make a bit plane. All of the most significant bits 106 of the image pixels 102 comprise a most significant bit plane 110. Similarly, all of the least significant bits 108 of the image pixels 102 comprise a least significant bit plane 112. FIG. 1E illustrates corresponding digital data from a time series such as audio data. The audio digital data is represented as samples (columns) 124, wherein each sample is represented by a most significant bit 106 down to a least significant bit 108. The rows of corresponding bits are referred to herein as planes, even though they are single rows, from a most significant bit plane 110 to a least significant bit plane 112.

The representation of the image 100 in the order of the significance of the bits which define the pixels is but one way of representing the digital data as the image. Generally, the digital data comprises a plurality of samples, each of the samples being defined by a plurality of bits, wherein the samples are pixels for image data, time samples for audio data, and spatial temporal samples for video data. The method would then transform the plurality of bits into an alternative representation having at least first and second characteristic components. The predetermined bits comprise one of the first and second characteristic components. If associated data is also to be inserted, the associated data is inserted into at least a portion of the second characteristic component.

Figure 1D:
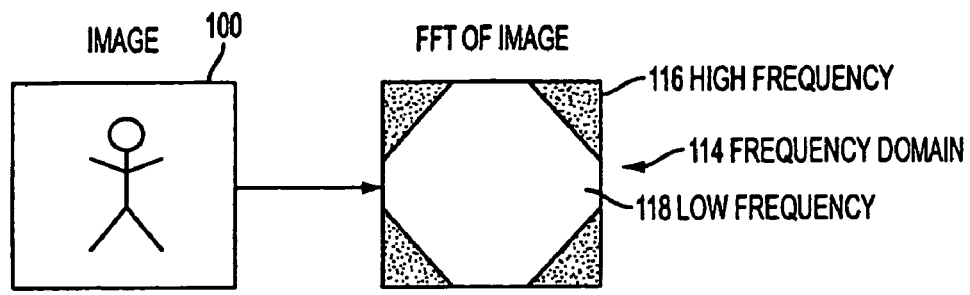
FIG. 1D illustrates the image or image-frame of FIG. 1A in which the digital data is transformed into a frequency domain having a high and allow frequency component.
Figure 1E:
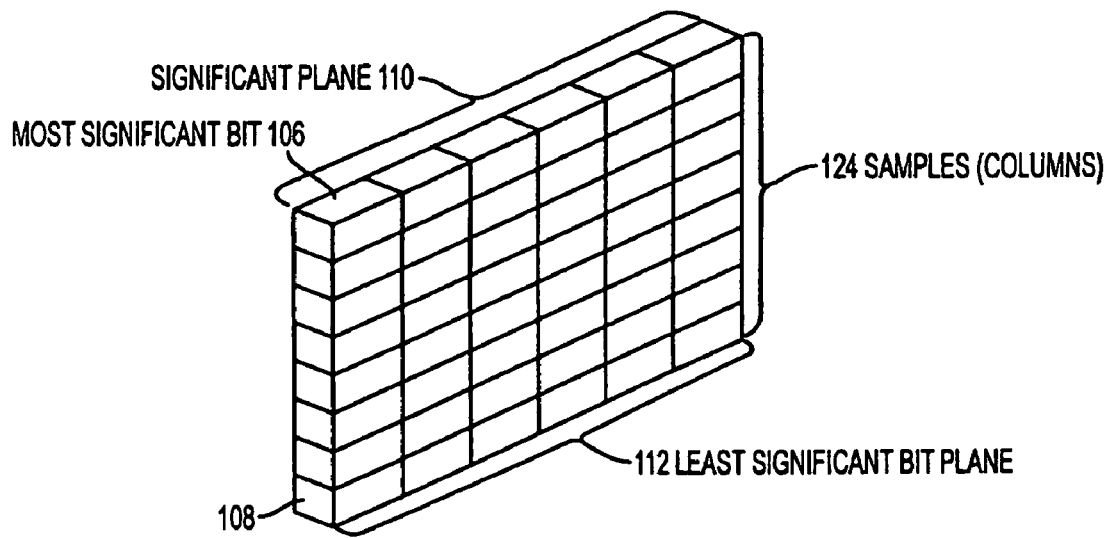
FIG. 1E illustrates audio digital data represented as bit planes, from a most significant bit plane to a least significant bit plane.

One such way to define the image is to transform the digital data into a frequency domain 114 as illustrated in FIG. 1D. In the frequency domain, the image 100 is transformed into components of high and low frequencies, 116, 118, respectively. The high frequency component 116 being less perceptible to the human eye than the low frequency component 118. Preferably, the predetermined bits comprise a portion of the high frequency component and the associated data, if any, is inserted in the remaining high frequency component and/or the low frequency component.

The number of bits needed to sign (insert a digital signature) or authenticate the image 100 is very small, preferably between 128 and 256 bits. This is especially true when compared with typical image dimensions of 512×512× 24 bits. Typically, the digital signature is inserted into the LSB plane because it is the plane which is least perceptible to the human eye. However, it is entirely unnecessary to alter all the least significant bits of the image 100, only a portion of the LSB plane 120 need be altered by the insertion of the digital signature. Thus, a simple signing procedure inserted into the portion 120 of the LSB plane provides a basic authentication procedure with the minimal alteration of the original image.

Figure 2A:
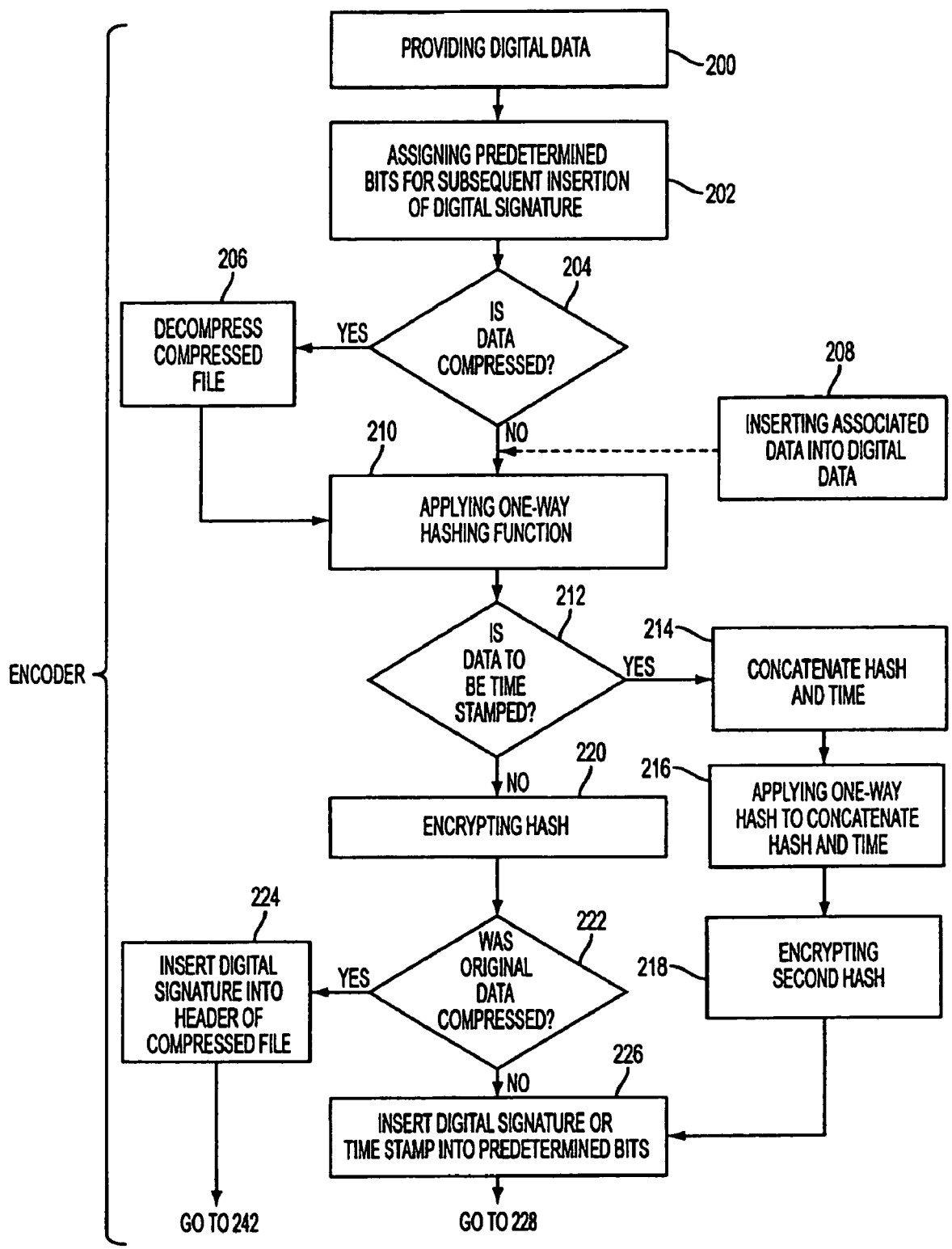
FIG. 2A is a flowchart illustrating a preferred method of inserting a digital signature into digital data of the present invention.

The basic insertion method of the present invention is illustrated in some of the steps of FIG. 2A. In step 200, the digital data is provided which defines the digital image (or alternatively, digital video or audio). In step 202, predetermined bits of the digital data is assigned for subsequent insertion of a digital signature. Preferably, the predetermined bits comprise at least a portion of the LSB plane 120, however any portion of the digital data can be assigned as the predetermined bits. The number of the predetermined bits is preferably the same as the number of bits in the digital signature. However, the number of the predetermined bits can alternatively be larger than the size of the digital signature to allow for insertion of more than one digital signature or other data.

Next, the digital data excluding the predetermined bits is signed resulting in the digital signature. Any signing method known in the art can be used without departing from the scope or spirit of the present invention. Preferably, the signing is accomplished by first applying a one-way hashing function to the digital data excluding the predetermined bits resulting in a hash (or hash value). This is shown at step 210. The hash is then encrypted at step 220 resulting in the digital signature. The digital signature is then inserted into the predetermined bits of the digital data at step 226. The remaining steps illustrated in the flowchart of FIG. 2A are preferable or alternative steps to the method previously described.

Figure 2B:
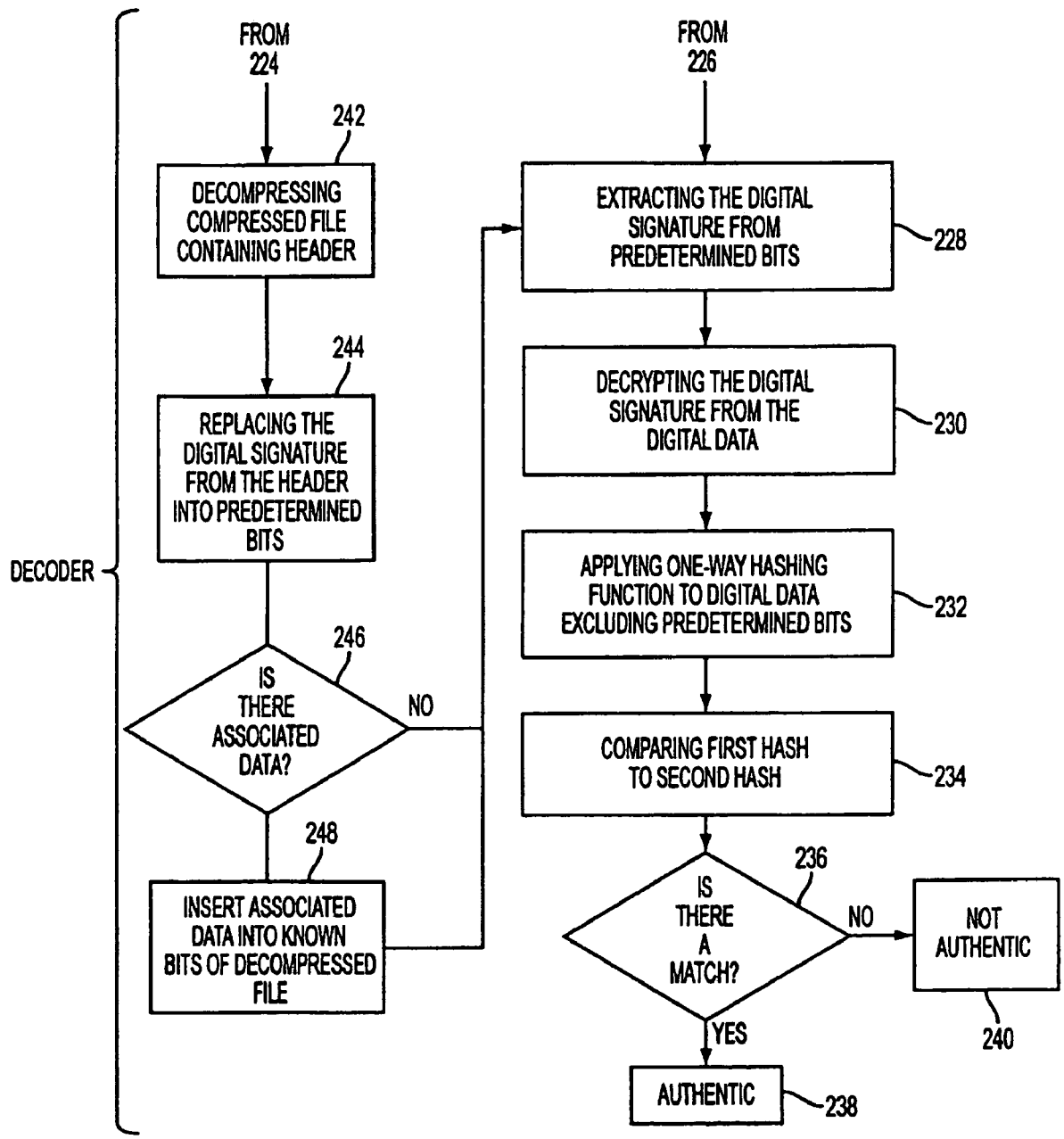
FIG. 2B is a flowchart illustrating a preferred method of authenticating digital data having an embedded digital signature in predetermined bits of the digital data.

The basic method of the present invention for authenticating the digital data once the digital signature has been inserted into the predetermined bits will now be described with reference to FIG. 2B. At step 228 the digital signature is, extracted from the known location of the predetermined bits 120. At step 230 the digital signature is decrypted from the digital signature resulting in a first hash. At step 232, a known one-way hashing function which is used to encode the digital data is applied to the digital data excluding the predetermined bits resulting in a second hash. At step 234, the first hash and the second hash are compared and there is a determination of whether or not they match (step 236). If the first and second hashes match (step 238) the digital data is authenticated, if they do not match (step 240) the digital data is not authenticated. The remaining steps illustrated in the flowchart of FIG. 2B are preferred steps corresponding to some of the preferred steps of FIG. 2A, which will be discussed below.

A limitation of this method is that it does not localize the region of the image that has been altered. Rather, the algorithm simply declares that the image is or is not authentic. There are many situations where this is adequate. However, it is straightforward to extend this approach to a block based method in which each block is independently signed. Further, the signature need not be placed in the LSB's of an image. The key property is that the image is partitioned into two disjoint partitions. The first partition must capture the key properties that must be authenticated. The second partition is a preferably redundant, possibly perceptually insignificant region of the image. For example, a frequency based system is also possible in which the image (or subimages) are first transformed into the frequency domain 114. Next, the low frequency perceptually significant components 118 of the image 100 are authenticated while high frequency (perceptually insignificant) coefficients 116 are used to hold the digital signature. Many other variations are possible, including inserting into the least significant bits of the transformed domain.

Of course, it is well known that changes to the LSB of almost all images cannot be discerned. Thus, the other least significant bits, e.g. (512×512×1—the number used for the digital signature) offer an opportunity to embed or insert more information in the image (step 208), referred to herein as associated data. Methods of the prior art do not efficiently utilize these bits since the prior art methods require modification of all the least significant bits of a block. An alternative version of the present invention is to simply use this large-set of remaining bits to encode additional information associated with the image. Such information could include, but is not limited to the photographer's name, copyright permissions, a public key needed to decrypt the digital signature, a source or owner of the digital data such as a photographer who took the digital image, and Internet (URL) addresses. Alternatively, the associated data 122 can comprise at least two fields 122a, 122b each having separate data which may be dependent or independent from each other. For example, one field 122a may contain data identifying a public key needed to decrypt the digital signature and the second field 122b may contain data identifying the owner of the public key contained in the first field 122a. The content owner may choose to leave some of this information in the clear, i.e. unencrypted while other fields may be encoded.

Preferably, the associated data is treated as part of the image and is signed as well. Thus, not only is the image content authenticated but the associated information is as well. The associated data is illustrated in FIG. 1C as reference numeral 122 and is preferably inserted into the LSB plane in a portion excluding the predetermined bits which contain the digital signature. It should be apparent to those skilled in the art that embedding the associated data 122 in the remaining portion of the LSB plane 108 is only a preferable implementation of the methods of the present invention, and is given by way of example only. The associated data may be embedded in a variety of other ways, many of which have been described in the prior watermarking art.

It should be apparent to those skilled in the art, that the LSB plane exists analogously in other digital content forms. Generally, the digital data can be said to comprises a plurality of samples, wherein each of the samples are defined by a plurality of bits in the digital data, from a most significant bit to a least significant bit. In the case of digital image data, each sample is an image pixel, in digital video, each sample is a spatial temporal sample, while in digital audio, each sample is a time sample.

In an alternative version of the insertion methods of the present invention, the digital data comprises a plurality of samples, audio, video, or image. In this alternative, the least significant bit plane in the digital data is ignored. The associated data is concatenated to the digital data having the ignored least significant bit plane. The digital data having concatenated associated data is then signed resulting in the digital signature which is inserted in the predetermined bits. Where ignoring not only means that the least significant bit plane is not passed through the hash, but can also mean that all the bits in the LSB plane are set to 0 or 1 or to an arbitrary pattern, etc.

The methods of the present invention are not limited to signing the entire digital data. Subregions may also be signed. However, it should be apparent to those in the art that if the signature remains 128 bits in length, then there are 128N bits used for signing when the image is partitioned into N blocks. Thus, there may be a tradeoff between localization of the tampering and the amount of additional information that can be embedded into the image, especially if the LSB's are used to store the associated data and the signatures. In the limit, if each subblock only contains 128 pixels, then there is not additional capacity available in the LSB plane. Note, however, that Wong requires each sub-block to be less than or equal to the hash length, while the methods of the present invention preferably require each sub-block to be greater than or equal to the hash length.

Despite the very rapid progress in data storage and transmission rates, images still require very significant amounts of bandwidth and storage. Consequently, in many cases, the content owner will require that the digital data be compressed, e.g. JPEG for an image, or MPEG for video, for economic reasons. In such a situation it is desirable to sign the compressed image and, after decompression, have a signed image.

Referring back to FIG. 2A, it is first determined whether the digital data is compressed at step 204. If the data is not compressed the method follows to sign the digital data as previously described. If the digital data is compressed, the digital data is decompressed at step 206 such that a signature can be computed at steps 210 and 220. The digital signature is then inserted into a header of the compressed file at steps 222 and 224. Preferably, the decompression algorithm used is modified such that after decompression of the image, the signature present in the header is copied to the corresponding predetermined bits of the decompressed image.

Referring now to FIG. 2B, when the compressed file with the digital signature in the header is authenticated, the compressed file is decompressed at step 242 and the digital signature in the header is inserted into the predetermined bits of the digital data at step 244. If the digital data also contains associated data (step 246, YES decision), the associated data may be inserted in the header at step 224 and into the digital data at step 248 after decompression at step 242. Alternatively, the associated data may be inserted into the image prior to compression and in such a manner that the associated data survives the compression step. The method for authenticating the digital signature (and associated data if present) then follows steps 228 to 240 as previously described above.

Alternatively, the authentication capabilities of the methods of the present invention are extended to include time stamping which comprises inserting time data into the digital data for identifying the time the digital data was created. Referring back to FIG. 2A, the basic procedure for time stamping digital data consists of first passing the digital data through a one-way hash function 210 as previously described. If the digital data is to be time stamped (step 212, Yes Decision), the one-way hash and signature are transmitted to a trusted third party which concatenates the hash, signature, and time data at step 214 and passes the hash, signature, and the current time/date (time data) through another round of one-way hashing at step 216. This hash is then encrypted at step 218 using a public key encryption method and the encrypted signature and time data are returned to the content owner. The signature and time data can again be encoded in some portion of the predetermined bits of the digital data at step 226 as previously described. In such a manner, it is possible to both prove that the image has not been tampered with and to determine a date by which the original content must have existed. It should be apparent to those skilled in the art that any time stamping procedure known in the art can be used without departing from the scope or spirit of the present invention.

Figure 3:
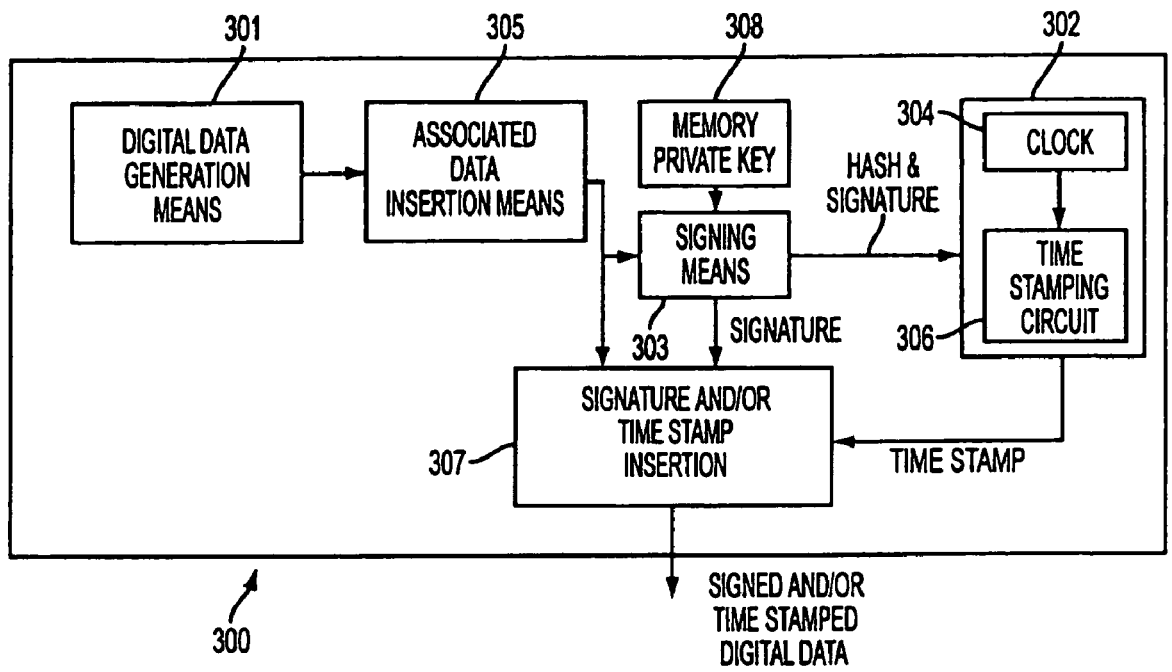
FIG. 3 is a schematical illustration of a device for signing and/or time stamping digital data for subsequent authentication of the both the digital data and the time stamp.

This arrangement requires a trusted third party stamping organization. Typically, such an organization is accessible over a network, e.g. the Internet. However, such a configuration is not practical for immediately time stamping images generated by an image generation device, such as those taken by a digital camera, since the digital camera may not have access to the trusted third party. Referring now to FIG. 3, an alternative arrangement is to equip each digital camera or image generation device 300 having digital data generation means 301, such as a digital scanner or digital video camera, with a semiconductor chip 302 having a tamper resistant clock 304 and a tamper resistant time stamping circuit 306 such as a public key encryption system that can serve the same roll as the trusted third party. Such a device 300 would preferably have its private key embedded in a memory 308 such that it was inaccessible. The tamper resistant clock would be set at the factory and also be unalterable by any user. Preferably, the corresponding public key is placed in the clear (unencrypted) within a field of the LSB's of the image. The digital data is then signed by a signing means 303 using the private key from memory 308. If associated data is to be inserted, an associated data insertion means 305 inserts the associated data into the digital data before signing by the signing means 303. The associated data (if any), signature, and time stamp (if any) are then supplied to an insertion means 307 for insertion of the signature and/or time stamp resulting in signed and/or time stamped digital data.

Figure 4:
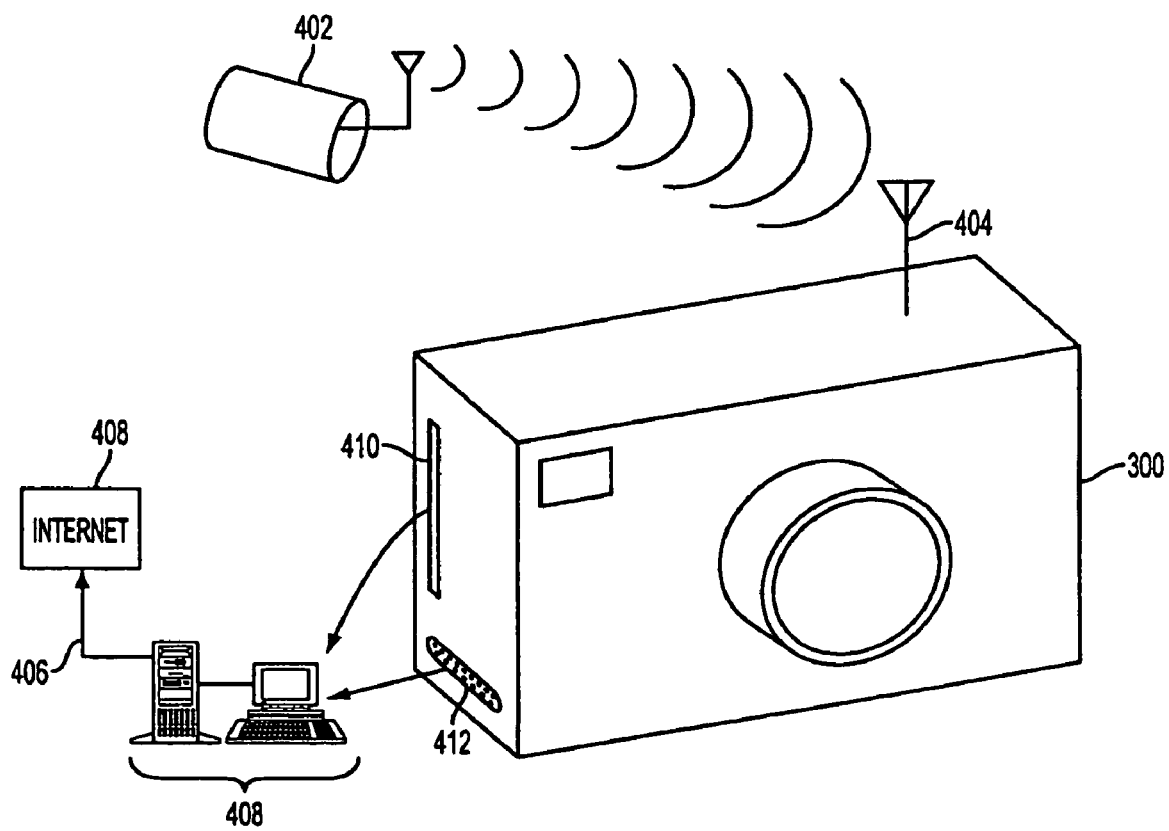
FIG. 4 is a schematical illustration of a device for inserting data into a digital having means for receiving the inserted data from an external source.

Such tamper resistant hardware could also provide information other than time. For example, referring to FIG. 4, it is possible that image generation devices 300 also be equipped for receiving data such as the associated data, from an external source 402, such as a GPS (Global Positioning Satellite) transmission with a reception means 404 such as an antenna. In such circumstances, it is possible to verify not only the time the digital data was created (e.g., the time the photograph was taken) but also the location. In such a method the image generation device 300 would receive the data to be inserted, preferably an RF (radio frequency) transmission such as from a GPS transmission, insert the data into the digital data, and then authenticate the digital data as well as any associated data inserted therein as previously described. The external source can also be an internet link 406 in which the image generation device 400 is linked with a personal computer 408 having access to the internet 408 and capable of receiving the data transmission from an internet site. The data can be downloaded from the digital camera or other image generation device 300 via a memory card slot or through a cable interface 412 connected to the personal computer 408.

In the case of digital cameras or other digital content creation devices, authentication and time stamping require the use of a public key encryption system. The device encrypts the signature and/or time stamp using the camera's private key. The reader must then have knowledge of the corresponding public key in order to, say, authenticate the image. However, there are potentially millions of such devices in existence. One important use for the LSB's of an image is to hold the corresponding public key of the device, such as a camera so as to enable authentication. However, at this point all that can be confirmed is that a specific camera captured the image. The viewer does not know who took the photograph.

In an alternative version of the methods of the prior art, this knowledge can also be provided by allowing the photographer (user) to program his/her camera (image generation device) with his/her name and public and private keys. The photographer's name, say Adam, and public key may be placed in the clear in a field within the LSB's of the image (digital data) that are also authenticated. The image, together with all the LSB's except those that are used to store the signature are then first signed by the camera using its private key. Next this signature is encrypted using the photographer's private key.

Several levels of signing are possible. This allows the image to be signed by the camera (indicating that the data has not been processed subsequent to its recording from the CCD array), the photographer (identifying the person responsible for the image), the distributor, etc. However, earlier levels of signing must leave bits available to accommodate the next level signature and possible associated data. For example, a digital camera might sign all the image bits except the LSB plane and insert its signature into a predetermined field in the LSB plane. Next, the photographer (either within the camera or on a PC) might insert associated data into other fields of the LSB plane and then sign these fields together with the signature from the camera. This second signature would be placed in another predetermined field of the LSB plane. Other iterations are possible, provided there is space remaining in the predetermined bits to store the signature. Note that the photographer signed the associated data and the camera's computed signature. This is sufficient to know that the photographer took the image, even though the second level of signing did not explicitly sign the image. However, this is an alternative method but is not the preferred embodiment since the hashing of the image data a second time is unnecessary given the signature from the camera.

Figure 5:
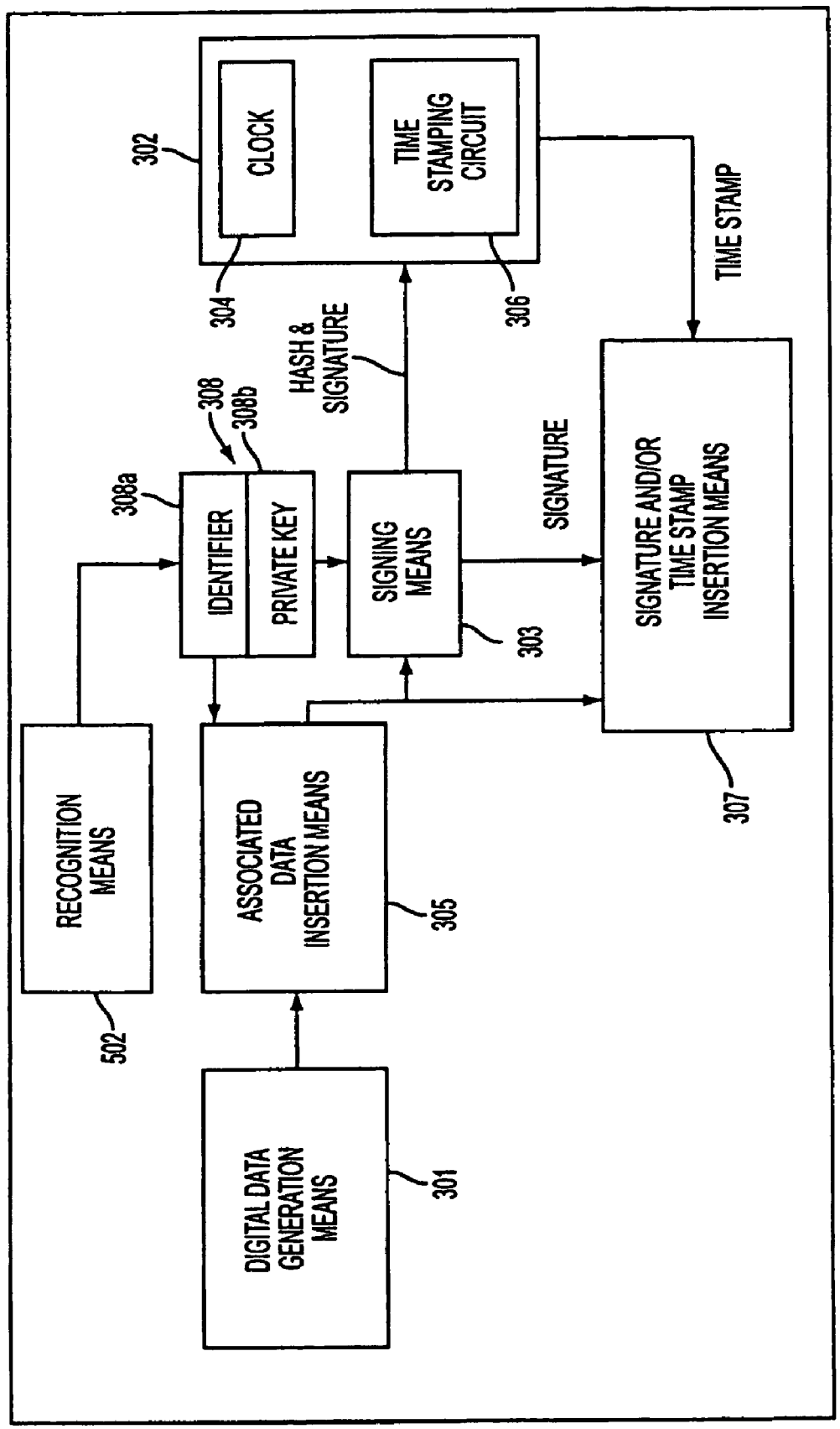
FIG. 5 is a schematical illustration of a device for inserting data into digital data having a recognition means for recognizing a user of the device and wherein the inserted data is an identifier which identifies the recognized user of the device.

Referring now to FIG. 5, a further refinement to programming the camera with a photographer's public and private keys would involve equipping the digital data generation means 300, i.e., camera, with a recognition means 502 such as a biometric identification system like a low cost fingerprint recognition system. The camera could then be programmed with the information of several photographers and would select the correct one based on the fingerprint of the person holding the camera 300.

In other words, the image generation device 300 as illustrated in FIG. 3 having digital data generation means 301 or other encoding device, would additionally have the recognition means 502 and the memory 308 would further store an identifier corresponding to each of at least one user of the device in one field 308a of the memory 308. The identifier is preferably a name of the photographer or other identifier such as a social security number. Preferably, a private key associated with each user is stored in a second field 308b in the memory 308. The recognition means 502 recognizes one of the users whose identifier is stored in the first field 308a of the memory 308. The identifier corresponding to the recognized user is output to the associated data insertion means 305 as associated data. Preferably, the recognized user's private key is output from the second field 308b of the memory 308 for use by the signing means 303 to sign the digital data, so that one can guarantee that the data (image) was never doctored or manipulated by secondary processing. As in the embodiment of FIG. 3, the associated data (if any), the time stamp (if any), and the signature are supplied to the insertion means 307 for insertion of the signature and/or time stamp resulting in signed and/or time stamped digital data. However, the digital data can also be signed after subsequent processing, such as in a P.C. In the case of a digital image taken by a digital camera, the digital image can first be loaded into a P.C. and manipulated with standard software known in the art, and then signed, wherein the manipulated image is subsequently authenticated.

Note that while the preferred embodiment has this second round of encryption occurring within the camera, this is not essential. For example, the image signed by the camera could be downloaded by the photographer onto a PC where an application program would perform the second round of encryption. In fact, for digital cameras that do not support authentication, all of the above procedures could be performed offline by a PC. The benefit of a camera based system is that the authentication is performed automatically after each photograph is taken. However, it is apparent that the photographer could be responsible for signing his work using a PC and associated software.

A viewer first decrypts the signature using the photographer's public key, available in a field within the LSB's of the image. This result is then decrypted using the camera's public key, also available within a field of the LSB's of the camera. At this point, the decrypted signature can be compared with the hash of the image and data to determine the authenticity of the whole.

Assuming that the authentication is positive, the viewer at this point only knows that someone claiming to be Adam was the source of the image. However, there is nothing to prevent someone from impersonating Adam. One last step therefore remains to be absolutely certain that the photographer is indeed Adam. The viewer must verify that Adam's public key is indeed Adam's. There are a variety of ways that this can be accomplished. For example, a trusted third party might provide a database listing photographers and their associated public keys. Such a database might be provided by a not-for-profit professional photographic body or commercial entity. Such a database might be online and/or periodically published much like a telephone directory. A less centralized solution might involve accessing the homepage of Adam on the Internet, where his public key would be printed. Of course, the impersonator would also be aware of Adam's public key. However, since he does not know Adam's private key, it is impossible for him to correctly encrypt the signature. This is the great strength of public key encryption systems.

A further refinement of the system can be developed when it is realized that a photographer may have many cameras. In such a situation, the photographer may desire that all cameras owned by him use a single private key associated with the photographer. This is in contrast to an individual key for each camera. Nevertheless, the tamper resistant chip could also include the serial number of the camera, thereby identifying which of the photographer's cameras actually took the picture.

It should also be apparent that while this description has focused on still images, the methods are also applicable to video, audio and multimedia forms of content.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for inserting a digital signature into digital data, the digital data comprising bits, the method comprising the steps of:
    assigning predetermined bits of the digital data for receiving the digital signature;
    inserting associated data into the digital data;
    signing the digital data, excluding the predetermined bits in the digital data, with the digital signature, the digital data including the inserted associated data;
    inserting the digital signature into the predetermined bits of the digital data for subsequent authentication of the digital data and the associated data;
    receiving the associated data from a Global Positioning Satellite transmission;
    wherein at least a portion of the associated data comprises data identifying a public key needed to decrypt the digital signature; and
    outputting the digital data with the digital signature inserted into the predetermined bits.

2. The method of claim 1, wherein the signing step comprises:
    applying a one-way hashing function to the digital data excluding said predetermined bits resulting in a hash; and encrypting the hash.

3. The method of claim 1, wherein the digital data is selected from a group consisting of image data, video data, and audio data.

4. The method of claim 1, wherein the associated data is inserted into the bits of the digital data excluding the predetermined bits.

5. The method of claim 1, wherein the digital data comprises a plurality of samples, each of the samples being defined by a plurality of the bits, from a most significant bit to a least significant bit, all of the least significant bits defining the plurality of samples comprising a least significant bit plane, wherein the predetermined bits comprise at least a portion of the least significant bit plane.

6. The method of claim 5, wherein the digital data is an image and each sample is an image pixel.

7. The method of claim 5, wherein the digital data is video and each sample is a spatial temporal sample.

8. The method of claim 5, wherein the digital data is audio and each sample is a time sample.

9. The method of claim 5, wherein the associated data is inserted into at least a portion of the remaining least significant bits in the least significant bit plane.

10. The method of claim 1, wherein the digital data comprises a plurality of samples, each of the samples being defined by a plurality of the bits, further comprising the step of transforming the plurality of bits into an alternative representation having at least first and second characteristic components, wherein the predetermined bits comprise the first characteristic component.

11. The method of claim 10, wherein the digital data is an image and each sample is an image pixel.

12. The method of claim 10, wherein the digital data is video and each sample is a spatial temporal sample.

13. The method of claim 10, wherein the digital data is audio and each sample is a time sample.

14. The method of claim 10, wherein the associated data is inserted into at least a portion of the second characteristic component.

15. The method of claim 14, wherein the alternative representation is a frequency domain representation having high and low frequency components, wherein the first characteristic component is a portion of the high frequency component and the second characteristic component is the remaining high frequency component and the low frequency component.

16. The method of claim 1, wherein the associated data comprises data identifying a source of the digital data.

17. The method of claim 1, wherein the associated data comprises data identifying the identity of an owner of the digital data.

18. The method of claim 17, wherein the digital data is an image and the associated data comprises data identifying a photographer of the image.

19. The method of claim 1, wherein a portion of the associated data is encrypted and a remaining portion of the associated data is unencrypted.

20. The method of claim 1, wherein the associated data comprises at least two fields.

21. The method of claim 20, wherein at least one other field comprises data identifying the owner of the public key.

22. The method of claim 1, wherein the digital data is compressed using a compression standard resulting in a compressed file, wherein the method further comprises the steps of:
    creating a decompressed file prior to the signing step;
    signing the decompressed file resulting in the digital signature; and
    inserting the digital signature into a header in the compressed file instead of inserting the same into the digital data.

23. The method of claim 22, wherein the digital data is an image and the compression standard is JPEG.

24. The method of claim 22, wherein the digital data is video and the compression standard is MPEG.

25. The method of claim 1, wherein the digital data is compressed using a compression standard resulting in a compressed file, wherein the method further comprises the steps of:
    creating a decompressed file prior to the signing step;
    inserting the associated data into the decompressed file;
    signing the decompressed file resulting in the digital signature; and inserting the digital signature and associated data into a header in the compressed file instead of inserting the same into the digital data.

26. The method of claim 25, wherein the digital data is an image and the compression standard is JPEG.

27. The method of claim 25, wherein the digital data is video and the compression standard is MPEG.

28. The method of claim 1, wherein the digital data comprises a plurality of samples, each of the samples being defined by a plurality of the bits, from a most significant bit to a least significant bit, all of the least significant bits defining the plurality of samples comprising a least significant bit plane, wherein the method further comprises the steps of:
   ignoring the least significant bit plane in the digital data;
   concatenating the associated data to the digital data having the ignored least significant bit plane prior to the signing step;
   performing the signing step to the digital data having concatenated associated data resulting in the digital signature;
   wherein the predetermined bits comprise at least a portion of the least significant bit plane and the associated data is inserted into at least a portion of the remaining least significant bits in the least significant bit plane.

29. The method of claim 1, further comprising the steps of:
   providing time data identifying the time the digital data was created;
   concatenating the hash and the time data;
   applying a one-way hashing function to the concatenated hash and time data resulting in a second hash; and
   encrypting the second hash instead of the first hash to result in a time stamp containing the digital signature, wherein both the digital data and the time data are subsequently authenticated.

30. The method of claim 29, further comprising the steps of:
   transmitting the hash and signature to a third party for performance of the providing, concatenating, and encrypting steps; and
   receiving the time stamp from the third party prior to the inserting step.

31. The method of claim 30, wherein the trusted third party resides at an internet address and the transmitting and receiving steps are done through the internet.

32. The method of claim 29, wherein the time stamp is provided by a semiconductor chip having a tamper resistant clock and a tamper resistant time stamping circuit, wherein the clock outputs the time data which together with the digital signature is signed by the circuit to output the time stamp.

33. The method of claim 1, further comprising the steps of:
   storing an identifier in a memory corresponding to each of at least one user of a device which creates the digital data;
   recognizing a user of the device whose identifier is stored in the memory; and
   outputting the identifier corresponding to the recognized user from the memory to be inserted as the associated data.

34. The method of claim 33, further comprising the steps of storing a private key for signing the digital data in the memory corresponding to each user and using the private key for signing the digital data.

35. The method of claim 33, wherein the recognizing step is accomplished by a fingerprint recognition system.

36. The method of claim 33, wherein the identifier is a name of the recognized user.

37. An encoder for inserting a digital signature into digital data, the digital data comprising bits, the encoder comprising:
   means for assigning predetermined bits of the digital data for receiving the digital signature;
   means for signing the digital data excluding the predetermined bits in the digital data, with the digital signature, the digital data including the inserted associated data;
   means for inserting the digital signature into the predetermined bits of the digital data for subsequent authentication of the digital data;
   means for inserting associated data into the digital data prior to signing the digital data such that the encoder authenticates both the associated data as well as the digital data; and
   means for receiving the associated data from a Global Positioning Satellite transmission;
   wherein at least a portion of the associated data comprises data identifying a public key needed to decrypt the digital signature and at least a portion of the associated data comprises data identifying the identity of an owner of the digital data.

38. The encoder of claim 37, wherein the means for signing comprises:
   means for applying a one-way hashing function to the digital data excluding said predetermined bits resulting in a hash; and
   encrypting the hash.

39. The encoder of claim 37, wherein the digital data is selected from a group consisting of image data, video data, and audio data.

40. The encoder of claim 37, wherein the associated data is inserted into the bits of the digital data excluding the predetermined bits.

41. The encoder of claim 37, wherein the digital data comprises a plurality of samples, each of the samples being defined by a plurality of the bits, from a most significant bit to a least significant bit, all of the least significant bits defining the plurality of samples comprising a least significant bit plane, wherein the predetermined bits comprise at least a portion of the least significant bit plane.

42. The encoder of claim 41, wherein the digital data is an image and each sample is an image pixel.

43. The encoder of claim 41, wherein the digital data is video and each sample is a spatial temporal sample.

44. The encoder of claim 41, wherein the digital data is audio and each sample is a time sample.

45. The encoder of claim 41, wherein the associated data is inserted into at least a portion of the remaining least significant bits in the least significant bit plane.

46. The encoder of claim 37, wherein the digital data is an image comprising a plurality of samples, each of the samples being defined by a plurality of the bits, further comprising means for transforming the plurality of bits into an alternative representation having at least first and second characteristic components, wherein the predetermined bits comprise the first characteristic component.

47. The encoder of claim 46, wherein the digital data is an image and each sample is an image pixel.

48. The encoder of claim 46, wherein the digital data is video and each sample is a spatial temporal sample.

49. The encoder of claim 46, wherein the digital data is audio and each sample is a time sample.

50. The encoder of claim 46, wherein the associated data is inserted into at least a portion of second characteristic component.

51. The encoder of claim 50, wherein the alternative representation is a frequency domain representation having high and low frequency components, wherein the first characteristic component is a portion of the high frequency component and the second characteristic component is the remaining high frequency component and the low frequency component.

52. The encoder of claim 37, wherein the associated data comprises data identifying a source of the digital data.

53. The encoder of claim 37, wherein the digital data is an image and the associated data comprises data identifying a photographer of the image.

54. The encoder of claim 37, wherein a portion of the associated data is encrypted and a remaining portion of the associated data is unencrypted.

55. The encoder of claim 37, wherein the associated data comprises at least two fields.

56. The encoder of claim 37, wherein at least one of the fields comprises data identifying the owner of the public key.

57. The encoder of claim 37, wherein the digital data is compressed using a compression standard resulting in a compressed file, wherein the encoder further comprises:
   means for creating a decompressed file prior to signing the digital data;
   means for signing the decompressed file resulting in the digital signature; and
   means for inserting the digital signature into a header in the compressed file instead of inserting the same into the digital data.

58. The encoder of claim 57, wherein the digital data is an image and the compression standard is JPEG.

59. The encoder of claim 57, wherein the digital data is video and the compression standard is MPEG.

60. The encoder of claim 37, wherein the digital data is compressed using a compression standard resulting in a compressed file, wherein the encoder further comprises:
   means for creating a decompressed file prior to signing the digital data;
   means for inserting the associated data into the decompressed file;
   means for signing the decompressed file with the associated data inserted therein resulting in the digital signature; and
   means for inserting the digital signature and associated data into a header in the compressed file instead of inserting the same into the digital data.

61. The encoder of claim 60, wherein the digital data is an image and the compression standard is JPEG.

62. The encoder of claim 60, wherein the digital data is video and the compression standard is MPEG.

63. The encoder of claim 37, wherein the digital data comprises a plurality of samples, each of the samples being defined by a plurality of the bits, from a most significant bit to a least significant bit, all of the least significant bits defining the plurality of samples comprising a least significant bit plane, wherein the encoder further comprises:
   means for ignoring at least a portion of the least significant bit plane in the digital data;
   means for concatenating the associated data to the digital data having the ignored least significant bit plane prior to signing the digital data;
   means for signing the digital data having the concatenated associated data resulting in the digital signature;
   wherein the predetermined bits comprise at least a portion of the least significant bit plane and the associated data is inserted into at least a portion of the remaining least significant bits in the least significant bit plane.

64. The encoder of claim 37, further comprising:
   means for providing time data identifying the time the digital data was created;
   means for concatenating the hash and the time data;
   means for applying a one-way hashing function to the concatenated hash and time data resulting in a second hash; and
   means for encrypting the second hash instead of the first hash to result in a time stamp containing the digital signature, wherein both the digital data and the time data are subsequently authenticated.

65. The encoder of claim 64, further comprising:
   means for transmitting the hash to a third party for providing the time stamp and concatenating the hash and time stamp; and
   means for receiving the second hash from the third party prior to encryption.

66. The encoder of claim 65, wherein the trusted third party resides at an internet address and the means for transmitting and receiving is a computer capable of accessing the internet and receiving the transmitted second hash.

67. The encoder of claim 64, further comprising a semiconductor chip having a tamper resistant clock and a tamper resistant time stamping circuit, wherein the clock outputs the time data which together with the digital signature is signed by the circuit to output the time stamp.

68. The encoder of claim 37, further comprising:
   a memory for storing an identifier corresponding to each of at least one user of a device which creates the digital data;
   recognition means for recognizing a user of the device whose identifier is stored in the memory; and
   output means for outputting the identifier corresponding to the recognized user from the memory to be inserted as the associated data.

69. The encoder of claim 68, wherein a private key for signing the digital data is also stored in memory corresponding to each user, wherein the identifier is inserted as associated data and the private key is used to sign the digital data.

70. The encoder of claim 69, wherein the recognition means is a fingerprint recognition system.

71. The encoder of claim 70, wherein the identifier is a name of the recognized user.

* * * * *